David A. Bies,
Terry D. Scharton,
INVENTORS.
BY.

GOLOVE & KLEINBERG,
ATTORNEYS.

3,606,233
VIBRATION ISOLATION SYSTEM
Terry D. Scharton, Santa Monica, and David A. Bies, Woodland Hills, Calif., assignors to Bolt Beranek and Newman Inc., Cambridge, Mass.
Filed Apr. 22, 1968, Ser. No. 723,186
Int. Cl. F16f 15/04
U.S. Cl. 248—358    14 Claims

ABSTRACT OF THE DISCLOSURE

A vibration isolation system for mechanically coupling a mass to a source of vibratory energy, while reducing transmissibility of the vibrating energy to the mass. The system is a hybrid device, combining both passive and active isolation apparatus for producing isolation over a prescribed frequency range of the generated vibrations, while permitting the mass to be rigidly coupled to the source for frequencies below the isolation range. The hybrid system has particular application in a helicopter to couple the fuselage to the rotor, producing isolation with respect to vibrations above the helicopter control frequency range.

---

This invention relates to vibration isolation apparatus, and more particularly to supportive and suspension systems adapted to be coupled between a source of mechanical vibrations and a mechanical structure, for reducing transmissibility of the vibrations from the source to the structure.

The elimination of mechanical vibrations from structure coupled to a vibration source has gained considerable importance in recent years, particularly with respect to vehicular transportation where it is desired to isolate human beings and delicate equipment from dynamic environments generated in supportive structure. In the past, principal efforts have been directed toward absorption of vibrations after their transmission to the receiving structure. In contrast to such vibration absorption systems, in which the receiving structure is coupled between the vibration source and the absorption device, a vibration isolation device is characteristically positioned between the vibration source and the receiving structure for eliminating or reducing the transmitted vibrations before they reach the receiving structure. This type of coupling between the vibration source and the receiving structure permits the mass of the structure to be supported by the vibration source through the isolation apparatus.

The increasing popularity of helicopters, in particular, has created a need for suspension systems coupled between the rotor and the fuselage, for isolating vibrations induced in the rotor with respect to the fuselage without interfering with helicopter control.

Vertical vibration environments are inherent to the essential characteristics of contemporary helicopter design. In conventional helicopters, the rotor blades are attached to a rotating hub by means of hinges which allow each blade several degrees of freedom. For example, each blade can be controlled to permit "feathering" or changes in blade pitch, to "flap" up and down, and to swing forward and backward. During climbing and diving maneuvers, the blades are controlled to feather differentially, i.e. they change their pitch as they advance and retreat during each revolution. Blade flap is provided for allowing accommodation of the blades to the varying forces encountered during revolution.

The helicopter rotor is a complex system of rotating parts which combines the lift, propulsive thrust and control functions of the craft. Changes in blade pitch (particular differential feathering), blade flapping and swing, produce vertically oriented vibrations at the rotating hub which are transmitted to the rotor shaft. Since the fuselage is suspended from the rotor shaft, it is apparent that these vibrations will be transmitted to the fuselage unless provision is made to reduce the transmissibility of vibrations from the rotor shaft to the fuselage. At the same time, however, the fuselage must be capable of responding to changes in lift and thrust produced through rotor control. This implies that any helicopter vibration isolation system interposed between the rotor shaft and the fuselage should be stiff at very low frequencies corresponding to the helicopter control frequency range (below approximately one-half cycle per second), and should be capable of effectively reducing transmisssibility to the fuselage of the vibrations induced in the rotor at frequencies above the control range. In addition, the isolation system should be capable of withstanding large moments and static loads without resulting in mechanical failure or excessive displacements.

Current helicopter designs make no provision for vibration isolation, so that rotor vibrations which are transmitted to the fuselage adversely affect helicopter performance, comfort and reliability.

Typical isolation systems in current use are of the passive type, i.e. devices which rely upon their inherent responses to mechanical excitation, such as springs and spring-dashpot combinations. Such passive systems are typically designed to provide adequate isolation within a particular frequency range of the excitation. For applications such as helicopters, however, an intermediate range of frequencies exists between the helicopter control frequency range and the passive isolator design frequency range, within which the passive system will produce resonant amplification of the excitation.

Passive isolators require either a utilization of auxiliary masses to provide dynamic isolation, or the use of flexible springs. In a helicopter (which requires a large amount of power for its payload), the use of an auxiliary mass is usually not practical, and the problem of low frequency resonance still exists. The use of a flexible spring to obtain vibration isolation at frequencies as low as three cycles per second may push the resonance frequency associated with the passive vibration isolation system down into the control frequency range of the helicopter. Further, when a soft spring is utilized, static or shock loads may result in bottoming and even mechanical failure of the passive system. Current passive vibration isolation systems do not satisfactorily meet helicopter requirements.

Another vibration isolation system is of the active type i.e. a vibration isolation device which utilizes an additional source of energy which is controlled to counteract the vibrational forces which would otherwise be transmitted to the receiving structure. Active vibration isolation systems have the advantage that their effective stiffness can be varied as a function of frequency. Thus it is possible to vary the stiffness of the isolator so as to operate as a stiff system at very low frequencies and to provide isolation at other frequencies.

Active vibration isolation systems have not been employed in helicopter design, since the load and frequency requirements of a rotor isolation system are difficult to attain with a completely active element, which is generally hydraulic or pneumatic in operation. The large static loads typical in helicopter flight, would require the provision of large static pressures in any hydraulic or pneumatic system. Furthermore, since the frequency range of rotor vibration extends to "high" frequencies (of example 100 cycles per second), the necessary softness for isolation throughout the frequency range of interest would require large amounts of pumping at such high frequencies. The power and control system requirements of a purely active system for meeting the pressure needs over the entire frequency range are formidable.

The vibration isolation apparatus of the present invention is a hybrid system which includes both passive and active portions. As applied to helicopter rotor vibration isolation, the present apparatus is a suspension system coupled between the rotor and the fuselage, for suspending the fuselage from the rotor while reducing vibration transmissibility.

The passive and active isolation systems are connected (either in series or in parallel) between the rotor shaft and the fuselage, and each of the systems affect isolation over different frequency ranges. The frequency range of operation of the active system is selected for counteracting the resonance amplification associated with the passive system, while the frequency range of operation of the passive system is selected to continue system isolation for frequencies above those corresponding to efficient operation of the active system.

In one hybrid configuration, the passive system is coupled to the rotor shaft, and receives the vertical rotor vibrations over the entire frequency range of interest. The response of the passive system to the rotor vibration is applied to the active vibration isolation system, coupled between the passive system output and the fuselage. The active system is controlled for reducing vibration transmissibility between its input and its output, only over a particular frequency range which does not impose excessive power and control system requirements.

The passive system contributes stiffness at low frequencies and isolation at high frequencies, while the active system is operable only in a narrow intermediate frequency range to override the resonance associated with the passive system. The result is a suspension system which rigidly couples the fuselage to the rotor shaft throughout the helicopter control frequency range (for example, from zero to one cycle per second), and which is soft above the helicopter control frequency range, while being capable of transmitting large moments and static loads without resulting in mechanical failure or excessive displacements.

The active system includes a relative velocity generating device having a response which is controlled to counteract the vibratory velocities which would otherwise be transmitted from the passive system to the fuselage. Energy from an auxiliary energy source is controllably applied to the velocity generating device, in response to a control signal which is proportional to movement of the fuselage.

Although the case of helicopter rotor isolation is stressed for the purpose of describing the apparatus according to the present invention, it must be understood that the hybrid vibration isolation system disclosed herein can be employed in other applications. Such apparatus can be utilized whenever it is desired to mechanically couple a mass to a source of vibratory energy, while at the same time reducing transmissibility of the vibratory energy to the mass. Examples of these applications include supportive systems for automobiles, buses and trucks, coupling apparatus between a ship and its propulsion source, and mounting apparatus for securing equipment to aircraft and aerospace vehicles.

It is therefore an object of the present invention to provide apparatus for mechanically coupling a mass to a source of vibratory energy, while reducing transmissibility of the vibratory energy to the mass.

It is a further object of the present invention to provide apparatus for mechanically coupling a mass to a source of vibratory energy, while reducing transmissibility of the vibratory energy to the mass over a selected range of frequencies of the vibratory energy.

It is another object of the present invention to provide apparatus adapted to suspend a helicopter fuselage from its rotor, while reducing transmissibility to the fuselage of vibrations induced in the rotor.

It is a still further object of the present invention to provide apparatus adapted to suspend a helicopter fuselage from its rotor, while providing vibration isolation between the rotor and the fuselage at all frequencies of vibration above the helicopter control frequency range.

It is yet another object of the present invention to provide vibration isolation apparatus having stiffness characteristics which can be varied over a preselected frequency range of the vibratory excitation.

It is another object of the present invention to provide a helicopter suspension system which rigidly couples the fuselage to the rotor throughout the helicopter control frequency range, and which provides vibration isolation at frequencies above this range without producing large displacements.

It is a further object of the present invention to provide vibration isolation apparatus, for utilization in automotive vehicles.

It is a still further object of the present invention to provide vibration isolation apparatus, for utilization in securing equipment to aircraft.

It is yet another object of the present invention to provide vibration isolation apparatus, for utilization in securing equipment to an aerospace vehicle.

It is still another object of the present invention to provide vibration isolation apparatus, for utilization in securing propulsion devices to a ship's structural members.

The novel features which are believed to be characteristic of the present invention, together with further objects and advantages thereof, will be better understood from the following description considered in connection with the accompanying drawings in which a preferred embodiment of the invention is illustrated by way of example. It is to be expressly understood, however, that the drawings are for the purpose of illustration and description only, and are not intended as a definition of the limits of the invention.

Figure 1:
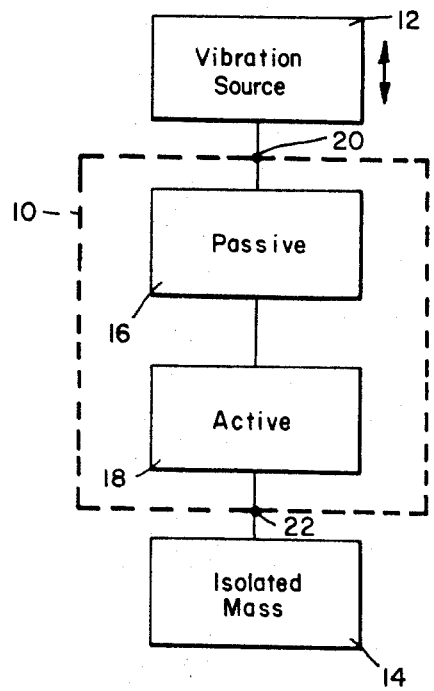
FIG. 1 is a block diagram of a preferred embodiment of a hybrid vibration isolation system according to the present invention.

Turning first to FIG. 1, a preferred vibration isolation system 10 according to the present invention mechanically couples a source of vibratory energy 12 to a mass 14. The purpose of the vibration isolation apparatus 10 is to reduce the transmissibility of the vibratory energy from the vibration source 12 to the mass 14, while at the same time permitting the mass 14 to be supported by or suspended from a structure in which vibrations are induced, i.e. the vibration source 12. Under these conditions, the mass 14 is commonly referred to as an isolated mass.

It can be appreciated that, when vertical vibrations are considered, the isolated mass 14 can be suspended from the vibration source 12 (through the vibration isolation apparatus 10), as in the case of a helicopter in which the rotor can be considered to be the vibration source 12 and the fuselage can be considered to be the isolated mass 14. Alternatively, the isolated mass 14 can be supported by the vibration source 12 (through the vibration isolation apparatus 10), as in the case of a land vehicle (such as an automobile, a bus or a truck), where the vehicle's wheels can be considered to be the vibration source 12 and its passenger and cargo compartments can be considered to be the isolated mass 14.

Furthermore, when horizontal vibrations are produced by the vibration source 12, the vibration isolation apparatus 10 can be used as a device for mechanically coupling the isolated mass 14 to the vibrating source 12, without having a supportive function. For example, in the case of a ship supported by a body of water, the propulsion propeller can be considered to be the vibration source 12, and the ship's hull can be considered to be the isolated mass 14.

Other applications include vibration isolation of equipment mounted to aircraft and aerospace vehicles. For example, for pilot isolation in aircraft, the pilot's seat can be considered to be the isolated mass 14, supported by the aircraft structural members (the vibration source 12) through the vibration isolation apparatus 10. Similarly, equipment mounted to an aerospace vehicle can be isolated from the vibrations generated in the vehicle's exterior structure during flight, upon consideration that the equipment (including a mounting panel, if any) is the isolated mass 14, and the aerospace vehicle structural members in the vicinity of the mounting station is the vibration source 12.

The preferred vibration isolation apparatus 10 includes a passive vibration isolation 16 and an active vibration isolation system 18, series connected between an input 20 and an output 22. The input 20 is adapted to be connected to the vibration source 12, while the output 22 is adapted to be connected to the isolated mass 14. Although the passive system 16 is shown connected to the input 20, and the active system 18 is shown connected to the output 22, it must be understood that the passive system 16 and the active system 18 operate in cooperation with one another, so that their relative positions can be interchanged without effecting vibration isolation between the vibration source 12 and the isolated mass 14. That is, in alternative configurations of the vibration isolation apparatus 10, the active system 18 can be connected to the input 20, and the passive system 16 can be connected to the output 22.

The passive isolation system 16 has stiffness characteristics for markedly reducing transmissibility of the vibratory energy to the isolated mass 14, over a first selected frequency range of the vibrations generated by the vibration source 12. The selected frequency range is sufficiently above the resonance frequency associated with the passive system 16, so that resonant amplification does not occur within this range.

The active system 18 functions to reduce transmissibility of the vibratory energy to the isolated mass 14, over a second selected frequency range of the vibrations generated by the vibration source 12. This second selected frequency range includes the resonant frequency associated with the passive system 16, so that the active system 18 operates within its frequency range to override the associated resonant amplification which would otherwise be transmitted to the isolated mass 14.

In the case of helicopter rotor isolation, it is desired to counteract low frequency excitation with a minimum of large displacements of the fuselage, while at the same time providing a rigid connection between the rotor and the fuselage in the control frequency range. Such requirements require that the vibration isolation apparatus 10 functions as a stiff system within the helicopter control frequency range, but provides isolation at frequencies above the control range. Active systems appropriate for helicopter rotor isolation have economic operating characteristics, in terms of auxiliary force and frequency response requirements, for adequate isolation below approximately ten cycles per second. Passive systems are easily designed for providing good isolation above approximately ten cycles per second. Such passive systems, when combined with a mass such as a helicopter fuselage, exhibits resonant amplification of the vibratory energy at some frequency below ten cycles per second but higher than the control frequency.

Figure 2:
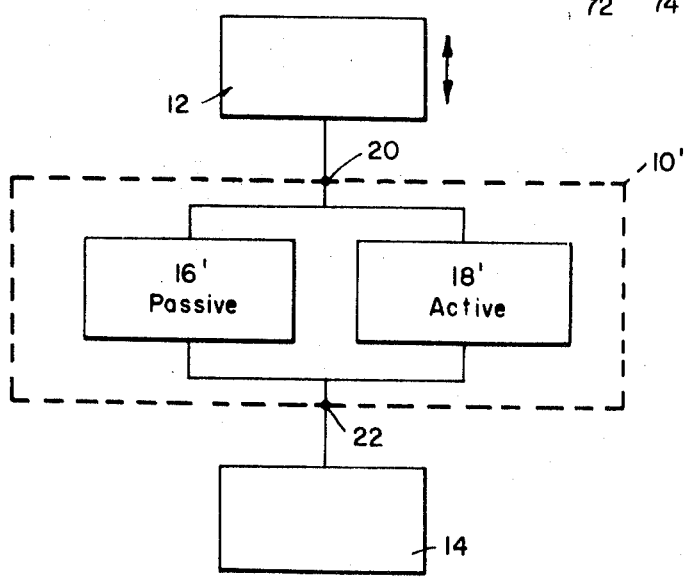
FIG. 2 is a block diagram of an alternative embodiment of a hybrid vibration isolation system according to the present invention.

An alternative embodiment 10' of vibration isolation apparatus according to the present invention is shown in FIG. 2 in which the passive isolation system 16' and the active isolation system 18' are connected in parallel between the vibration source 12 and the isolated mass 14.

Figure 3:
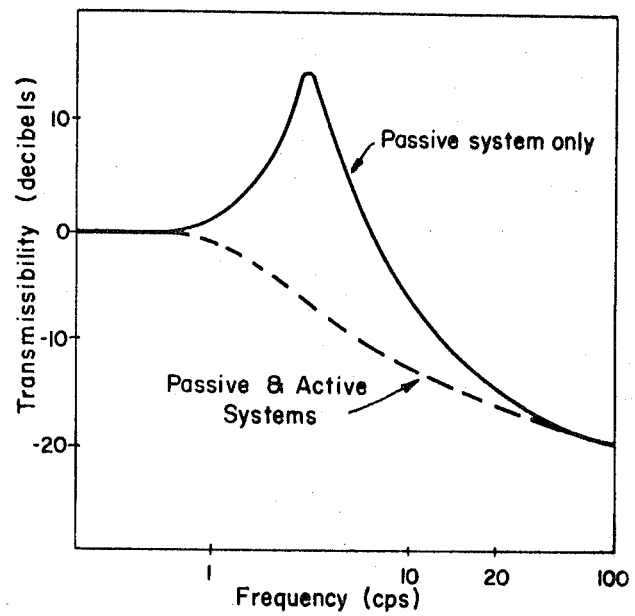
FIG. 3 is a graphical representation of vibration transmissibility as a function of excitation frequency, when a hybrid isolation system of the present invention is utilized as a helicopter isolator.

A typical case of helicopter rotor isolation provided by the hybrid apparatus of the present invention, is graphically represented in FIG. 3, showing vibration transmissibility as a function of the excitation frequency. Transmissibility is logarithmically represented as twenty times the logarithm (to the base 10) of the ratio of the movement of the isolated mass 14 to the movement of the vibration source 12. A passive system response is represented by a solid line, showing a marked increase in transmissibility due to resonant amplification of the passive system, within the frequency range from 1 to somewhat less than 10 cycles per second. When the passive system is combined with an active system, for example in accordance with the preferred embodiment of the present invention, and the active system is caused to operate principally in the frequency range between one and ten cycles per second, the transmissibility curve is modified as indicated by the dashed line. It can be seen that the combination of the active system with the passive system depresses the resonant amplication associated with the passive system, while permitting the fuelage to accurately respond to rotor control at frequencies below one cycle per second.

Figure 4:
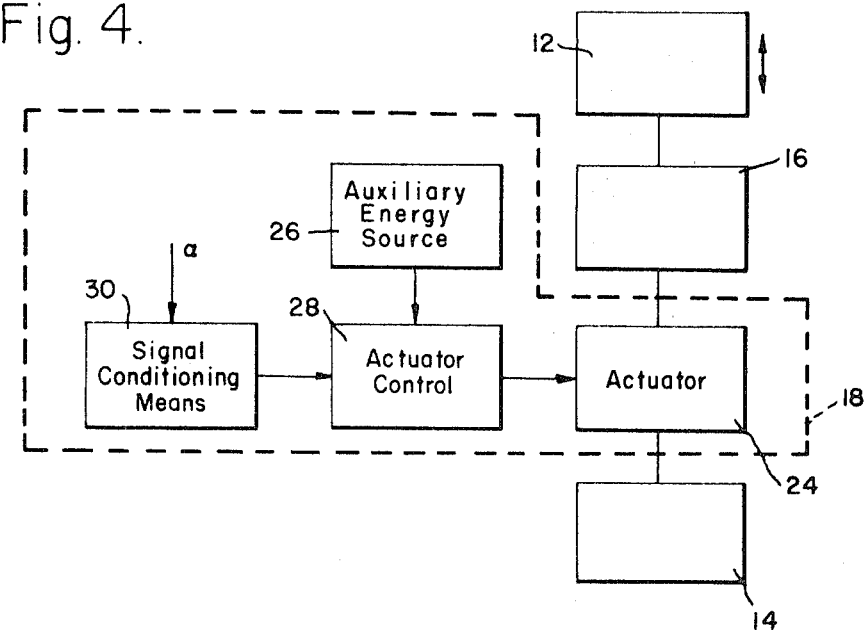
FIG. 4 is a block diagram of the preferred embodiment shown in FIG. 1, indicating the control apparatus of the active system shown in FIG. 1.

Turning now to FIG. 4, the necessary components for implementing the active system 18, are indicated. For the preferred embodiment, an actuator 24 is coupled between the passive system 16 and the isolated mass 14 (although the actuator 24 can alternatively be coupled between the passive system 16 and the vibration source 12, as previously disclosed).

The actuator 24 is adapted to respond to the transmitted vibrational energy of the passive system 16, within the second selected frequency range. The actuator response can be in the form of compensating velocities which are controlled in magnitude and direction as a function of frequency. This requires a source of energy which can be controlled in response to motion of the isolated mass 14. An auxiliary energy source 26 is therefore provided, and the introduction of energy therefrom into the actuator 24 is controlled by actuator control means 28.

The actuator control means 28 appropriately controls the response of the actuator 24, by means of an electrical fedback signal α whose amplitude and phase is modified in such manner to appropriately drive the actuator control 28 during the second selected frequency range. The feedback signal α can be proportional to the motion of the isolated mass 14, the motion of the passive system 16, the motion of the actuator 24, or the motion of the vibration source 12. Position, velocity or acceleration feedback can be utilized.

A signal conditioning circuit 30 modifies the feedback signal α to fix the signal gain as a function of frequency while providing phase compensation, to produce counteracting velocities by the actuator 24.

Figure 5:
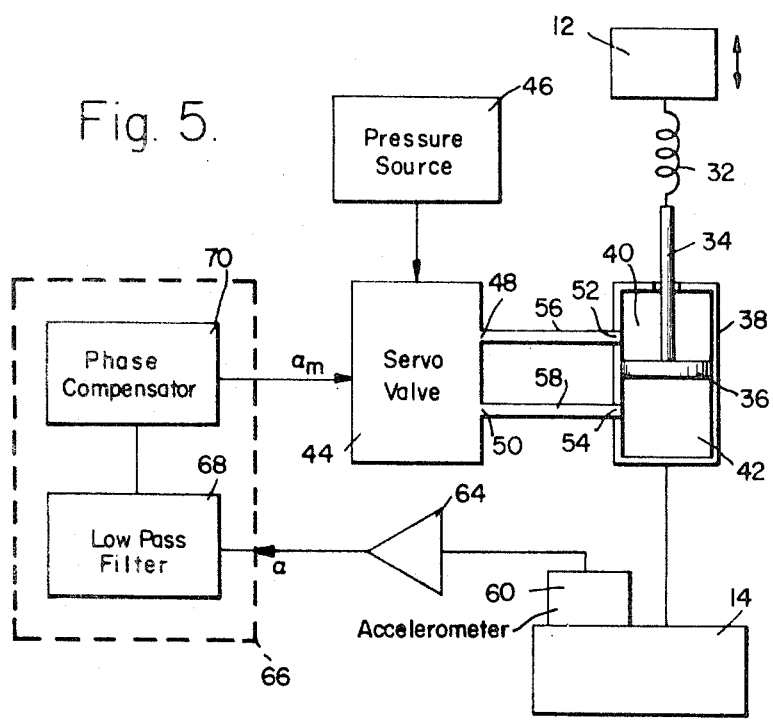
FIG. 5 is a part cross-section, part block diagram of a mechanization of the preferred embodiment of the vibration isolation apparatus shown in FIG. 3.

Turning to FIG. 5, there is shown a mechanization of the preferred embodiment of vibration isolation apparatus according to the present invention. A passive isolation system, such as a spring 32 (or a spring-dashpot combination) is connected between the vibration source 12 and a piston rod 34 attached to a piston 36. The piston 36 is adapted for movement within a cylinder 38, along the direction of the vibrations generated by the vibration source 12. The isolated mass 14 is mechanically coupled to the cylinder 38.

The cylinder 38 is supported with respect to the piston 36 by means of a first pressure chamber 40 and second pressure chamber 42, separated by the piston 36. When the pressures in each of the chambers 40, 42 are equal, the cylinder 38 follows the movements of the piston 36, which in turn follows the movements of the spring 32 through the piston rod 34. Since the isolated mass 14 is connected to the cylinder 36, the isolated mass 14 will vibrate in accordance with the vibrations of the spring 32, under this condition.

The active system provides vibration isolation by allowing the piston 36 to move relative to the cylinder 38. This is accomplished by varying the relative pressures in the first and second pressure chambers 40, 42, in such manner that the velocity of the cylinder 38 counteracts the velocity of the piston 36.

The chamber pressures are controlled by means of a servo valve 44, which can be an electromagnetically controlled slave valve. The servo valve 44 functions to meter the flow of fluid under pressure, as applied from a pressure source 46, from a pair of valve ports 48, 50, to the pressure chambers 40, 42. A first pressure chamber port 52 is connected to the first valve port 48, for example, by means of a first flexible pressure hose 56, and a second chamber port 54 is provided to permit flow between the second valve port 50 and the second chamber 42, by means of a second flexible pressure hose 58. The fluid under pressure supplied by the pressure source 46 can be either hydraulic or pneumatic.

The structure and operation of a suitable servo valve 44 is well known to those skilled in the art of pressure controls. For example, appropriate servo valves can be of the type corresponding to those sold under the trademark and designation "MOOG Flow Control Servovalves, Series 72 and 73," manufactured by MOOG Inc., East Aurora, N.Y., and which may be described in U.S. Pats. Nos. 2,920,650; 3,023,782; and 3,228,423.

Vibration of the isolated mass 14 is sensed by means of a transducer, such as an accelerometer 60, attached to the isolated mass 14. The accelerometer output signal is amplified by an amplifier 64, producing the feedback signal $\alpha$ which represents the vibrational response of the isolated mass 14, which after modification by a signal conditioning means 66, is applied to the servo valve for controlling the relative pressures in the cylinder chambers 40, 42.

The signal conditioning means 66 modifies the feedback signal $\alpha$ such that the modified feedback signal $\alpha_m$, which is applied to the servo valve 44, is controlled in its frequency response for causing the servo valve 44 to control the relative velocity of the piston 36 for producing isolation of the isolated mass 14 over the selected operation frequency range of the active system. The amplitude ratio of the modified feedback signal $\alpha_m$ (or the command voltage to the servo valve 44) with respect to feedback signal $\alpha$, must be of appropriate magnitude and phase angle in order that relative velocities which compensate for the vibration of the spring 32 are generated in the cylinder 38.

Accordingly, the signal conditioning means 66 includes a low pass filter 68 which transmits only those portions of the feedback signal $\alpha$ which are within the selected operating frequency range of the active system.

The signal conditioning means 66 further includes phase compensation means 70 which adjusts the phase and magnitude of the modified feedback signal $\alpha_m$ in such manner that the relative velocity generated in the cylinder 38 tends to decrease the velocity of the isolated mass 14.

The relative velocity generated by the active system, for decreasing the motion of the isolated mass 14, should be 90° out of phase with the force across the actuator. Under this condition, the active system behaves like a "negative spring" in that it opposes the transmitted vibrations. A certain amount of damping is desired to inhibit the resonance associated with the spring 32. The active system behaves like a damper when the relative velocity is in phase with the force.

At the same time, however, the dynamics of the various components of the active system cause the relative velocity across the actuator to lag the command voltages into the servo valve 44. The phase angle between the relative velocity of the actuator and the command voltage is a function of the frequency of the applied excitation, and the phase compensating means 70 must adequately compensate for this lag in its adjustment of the effective stiffness of the active system.

Figure 6:
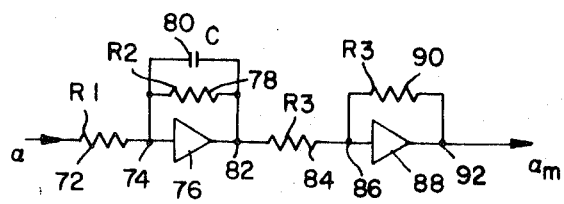
FIG. 6 is a schematic diagram of an example of the signal conditioning means shown in FIG. 5.

A suitable configuration of the signal conditioning means 66, is shown by the circuit of FIG. 6. A first resistor 72 of resistance $R_1$ is provided at an inverting input terminal 74 of a first operational amplifier 76. A parallel combination of a second resistor 78 and a capacitor 80 is connected across the inverting input terminal 74 and the output terminal 82 of the first operational amplifier 76.

A third resistor 84 of resistance $R_3$ is connected between the first operational amplifier output terminal 82 and an inverting input terminal 86 of a second operational amplifier 88. A fourth resistor 90, also of resistance $R_3$, is connected across the second operational amplifier inverting input terminal 86 and the output terminal 92 of the second operational amplifier 88. This combination of the third and fourth resistor 84, 90, and the operational amplifier 88, performs a 180° phase shift of the signal output from the first operational amplifier 76.

For this circuit, the characteristics of the modified feedback signal $\alpha_m$ with respect to the feedback signal $\alpha$, can be represented by the following equation:

$$\frac{\alpha_m}{\alpha} = \frac{R_2}{R_1}\left(\frac{1}{1+jf/f_0}\right)$$

where $f$ = the frequency of the vibratory excitation,
$f_0$ = the break frequency of the circuit = $1/2\pi R_2 C$ c.p.s., and
$j = \sqrt{-1}$ For operation of the active system within the frequency range of one to ten cycles per second, the break frequency $f_0$ can be selected at $1/2\pi$ cycles per second, by choosing $R_2 = 10^6$ ohms and $C = 10^{-6}$ farads.

Figure 7:
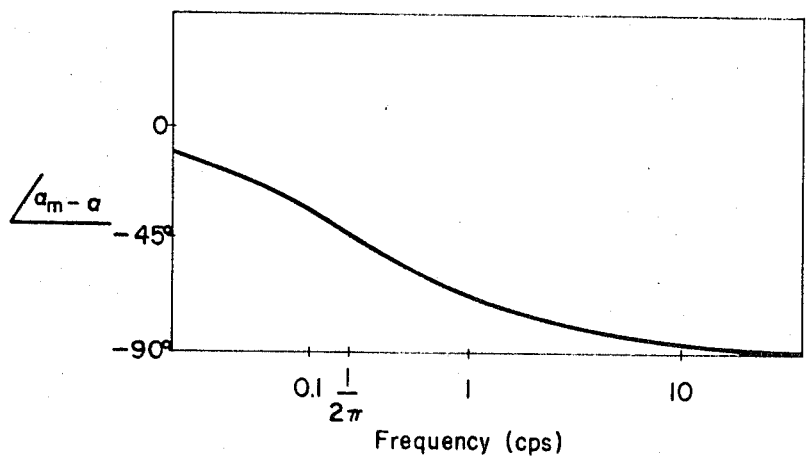
FIGS. 7 and 8 are graphical representations of the frequency response of the signal conditioning circuit shown in FIG. 6.
Figure 8:
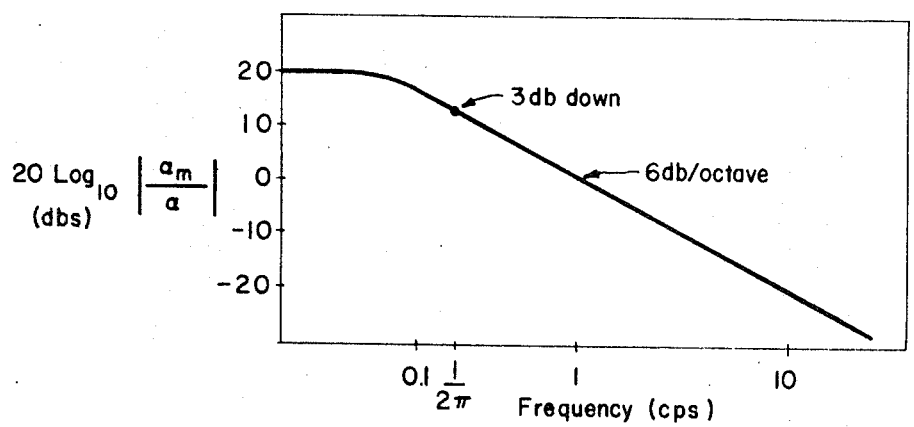

The frequency response of the circuit shown in FIG. 6 is graphically represented in FIGS. 7 and 8. FIG. 7 shows the difference in phase angle between the modified feedback signal $\alpha_m$ and the feedback signal $\alpha$, with respect to frequency. A relatively unchanging 90° phase difference is produced between one and ten cycles per second. At very low frequencies, the modified feedback signal $\alpha_m$ is substantially in phase with the feedback signal $\alpha$.

The gain provided by the circuit, as a function of frequency, is represented in FIG. 8. At very low frequencies, the amplitude of the modified feedback signal $\alpha_m$ does not vary with the amplitude of the feedback signal $\alpha$. The gain decreases with increasing frequency, and at the break frequency $1/2\pi$ cycles per second, the relative gain of the modified feedback signal $\alpha_m$ is three decibels down. The gain continues to decrease at the rate of six decibels per octave, extending through the frequency range of one to ten cycles per second.

Thus there has been described a preferred embodiment of apparatus adapted to be coupled between a mass and a source of vibratory energy, which functions to reduce transmissibility of the vibratory energy to the mass over a preselected frequency range of the vibratory excitation. The preferred embodiment is particularly well suited for utilization as a vibration isolator between a helicopter rotor and its fuselage, although its application to other vibration systems is included within the scope of the invention.

Other embodiments of the present invention, and modifications of the embodiments presented herein, may be developed without departing from the essential characteristics thereof. Accordingly, the invention should be limited only by the scope of the claims appended below.

What is claimed as new is:

1. Apparatus for mechanically coupling a mass to a source of vibratory energy, and for reducing transmissibility of the vibratory energy over a predetermined portion of the frequency spectrum to the mass, comprising the combination of:

passive isolation means for reducing transmissibility of the vibratory energy to the mass over a first selected frequency range and having a resonance in a second, selected frequency range, and, active isolation means for reducing transmissibility of the vibratory energy to the mass over a second selected frequency range contiguous to and partially coextensive with said first frequency range which includes the resonance frequency associated with said passive means, said first and second frequency ranges comprising the predetermined portion of the frequency spectrum, said passive isolation means and said active isolation means connected between an input side and an output side, said input side adapted to be connected to the source of vibratory energy for receiving the vibratory energy therefrom, and said output side adapted to be connected to the mass.

2. The apparatus according to claim 1, above, wherein said passive isolation means and said active isolation means are series connected between said input side and said output side.

3. The apparatus according to claim 1, above, wherein said passive isolation means and said active isolation means are parallel connected between said input side and said output side.

4. Apparatus for mechanically coupling a mass to a source of vibratory energy, and for reducing transmissibility of the vibratory energy to the mass, over a predetermined portion of the frequency spectrum from 1.0 Hz. to 100 Hz. comprising the combination of:

passive isolation means adapted to be connected to the source of vibratory energy, for reducing transmissibility of the vibratory energy to the mass over a first selected frequency range approximately 10 Hz. to 100 Hz., and active isolation means connected to said passive means and adapted to be connected to the mass, for reducing transmissibility of the vibratory energy to the mass over a second selected frequency range from 1.0 Hz. through 10 Hz., partially coextensive with and contiguous to said first frequency range and which includes the resonance frequency associated with said passive means, said first and second freqeuncy ranges comprising the predetermined portion of the frequency spectrum.

5. The apparatus according to claim 4, above, wherein said passive means includes a spring.

6. The apparatus according to claim 4, above, wherein said active means includes:

actuator means connected between said passive isolation means and the mass, for applying relative velocities between said passive means and the mass which counteract transmitted vibrations of said passive means over said second selected frequency range;

control signal means for generating a control signal proportional to the relative velocity to be applied by said actuator means for counteracting transmitted vibrations of said passive means over said second selected frequency range; and actuator control means adapted to be connected to an auxiliary source of energy and further connected to said actuator means, said actuator control means adapted to receive said control signal, for controlling the flow of energy between the auxiliary source and said actuator means in response to said control signal.

7. The apparatus according to claim 6, above, wherein said actuator means includes a piston and a cylinder, said piston positioned within said cylinder and coupled to said passive means, and said cylinder is adapted to be coupled to the mass.

8. The apparatus according to claim 6, above, wherein said actuator control means is a servo valve adapted to be connected to a source of fluid under pressure for controlling fluid pressures in said actuator means, and said actuator means is responsive to the controlled fluid pressures to generate said relative velocities.

9. The apparatus according to claim 6, above, wherein said control signal means includes:

transducer means for generating a first electrical signal proportional to the transmitted vibrations, and signal conditioning means for modifying said first electrical signal in amplitude and phase to generate said control signal.

10. The apparatus of claim 9, above, wherein said transducer means is an accelerometer adapted to be attached to the mass for receiving motion transmitted to the mass and for generating said first electrical signal therefrom.

11. The apparatus according to claim 4, above wherein said active isolation means includes:

actuator means connected between said passive isolation means and the mass, for driving the mass with respect to said passive isolation means in a manner which reduces vibrations of the mass over said second selected frequency range;

actuator control means adapted to be connected to an auxiliary source of energy and further connected to said actuator means for controlling said actuator means in said manner in response to an applied control signal; and control signal means for generating said control signal and applying said control signal to said actuator control means.

12. The apparatus according to claim 11, above, wherein said control signal means includes:

transducer means for generating a first electrical signal proportional to motion of the mass; and signal conditioning means for modifying said first electrical signal, to generate said control signal.

13. The apparatus according to claim 12, above wherein said signal conditioning means conforms to a frequency response by which the difference in phase between said control signal and said first electrical signal is approximately 90° throughout said second selected frequency range, and by which the gain of said control signal with respect to said first electrical signal decreases with increasing frequency throughout said second selected frequency range.

14. Apparatus according to claim 12, above, wherein said signal conditioning means includes:

an input terminal for receiving said first electrical signal;

a first operational amplifier having a first inverting input terminal and an output terminal;

a first resistor connected between said input terminal and said first inverting input terminal;

a second resistor and a capacitor parallel connected between said first inverting input terminal and said output terminal of said first operational amplifier;

a second operational amplifier having a second inverting input terminal and an output terminal;
a third resistor connected between said first operational amplifier output terminal and said second inverting input terminal;
a fourth resistor connected between said second inverting input terminal and said output terminal of said second operational amplifier;
whereby said control signal is generated at said second operational amplifier output terminal when said first electrical signal is applied to said input terminal.

References Cited

UNITED STATES PATENTS

| | | | |
|---|---|---|---|
| 2,964,272 | 12/1960 | Olson | 248—19 |
| 3,088,062 | 4/1963 | Hudimac | 318—128 |
| 3,477,665 | 11/1969 | Legrand | 244—17.25 |

J. FRANKLIN FOSS, Primary Examiner

U.S. Cl. X.R.

244—17.25; 248—20